United States Patent
Nakajima

(10) Patent No.: US 9,216,656 B2
(45) Date of Patent: Dec. 22, 2015

(54) VEHICLE CHARGING PORT LOCKING DEVICE

(71) Applicant: Nissan Motor Co., Ltd., Yokohama, Kanagawa (JP)

(72) Inventor: Tsuyoshi Nakajima, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/346,662

(22) PCT Filed: Sep. 18, 2012

(86) PCT No.: PCT/JP2012/073795
§ 371 (c)(1),
(2) Date: Mar. 21, 2014

(87) PCT Pub. No.: WO2013/054645
PCT Pub. Date: Apr. 18, 2013

(65) Prior Publication Data
US 2014/0300320 A1    Oct. 9, 2014

(30) Foreign Application Priority Data

Oct. 11, 2011    (JP) .................................. 2011-224014

(51) Int. Cl.
*H01R 13/62*    (2006.01)
*B60L 11/18*    (2006.01)
*B60L 1/00*    (2006.01)
*B60L 3/00*    (2006.01)
(Continued)

(52) U.S. Cl.
CPC ............. *B60L 11/1818* (2013.01); *B60L 1/003* (2013.01); *B60L 3/0023* (2013.01); *H01R 13/6275* (2013.01); *H01R 13/6397* (2013.01); *B60L 2270/32* (2013.01); *B60L 2270/34* (2013.01); *H01M 2220/20* (2013.01); *Y02T 10/7005* (2013.01); *Y02T 90/14* (2013.01)

(58) Field of Classification Search
CPC ...................... H01R 13/6397; H01R 13/62933
USPC .......................................... 439/304, 310, 133
See application file for complete search history.

(56) References Cited

U.S. PATENT DOCUMENTS 5,906,500 A * 5/1999 Kakuta et al. .................. 439/310
6,203,355 B1 * 3/2001 Neblett et al. ................. 439/372
(Continued)

FOREIGN PATENT DOCUMENTS

JP    6-310207 A    11/1994
JP    9-161884 A    6/1997
(Continued)

*Primary Examiner* — Hae Moon Hyeon
(74) *Attorney, Agent, or Firm* — Global IP Counselors, LLP

(57) ABSTRACT

A vehicle charging port locking device has a charging port and a locking mechanism. The charging port has an engaged part that engage an engaging part of a charging connector for supplying power from an external power source to the charging port when in an engaged state. A restraining member is movably mounted between a locked state in which release of the engaged part is restricted by movement of the restraining member in a locking direction to prevent the engaging part from being released from the engaging state, and an unlocked state in which release of the engaging part is permitted by movement of the restraining member in an unlocking direction that is opposite the locking direction. The restraining member can be moved in the unlocking direction by operation of an exposed part that can be operated from beneath the hood of the vehicle.

12 Claims, 10 Drawing Sheets

(51) Int. Cl.
*H01R 13/627* (2006.01)
*H01R 13/639* (2006.01)

(56) References Cited

U.S. PATENT DOCUMENTS

| | | | |
|---|---|---|---|
| 8,075,329 B1* | 12/2011 | Janarthanam et al. | 439/304 |
| 8,376,768 B2* | 2/2013 | Kurumizawa et al. | 439/304 |
| 8,517,755 B2* | 8/2013 | Hirashita | 439/304 |
| 8,523,589 B2* | 9/2013 | Kurumizawa et al. | 439/304 |
| 8,602,804 B2* | 12/2013 | Kurumizawa et al. | 439/304 |
| 8,753,136 B2* | 6/2014 | Hirashita et al. | 439/304 |
| 8,944,477 B2* | 2/2015 | Proefke et al. | 292/144 |
| 2011/0201223 A1 | 8/2011 | Kurumizawa et al. | |
| 2011/0300728 A1* | 12/2011 | Katagiri et al. | 439/147 |
| 2012/0238122 A1* | 9/2012 | Hirashita et al. | 439/304 |
| 2014/0235086 A1* | 8/2014 | Nakajima | 439/347 |
| 2014/0235087 A1* | 8/2014 | Nakajima | 439/347 |
| 2014/0235089 A1* | 8/2014 | Nakajima | 439/350 |
| 2014/0300319 A1* | 10/2014 | Nakajima | 320/109 |
| 2014/0300320 A1* | 10/2014 | Nakajima | 320/109 |
| 2015/0035478 A1* | 2/2015 | Uchiyama et al. | 320/107 |
| 2015/0037994 A1* | 2/2015 | Nakajima | 439/304 |

FOREIGN PATENT DOCUMENTS

| | | |
|---|---|---|
| JP | 2011-20625 A | 2/2011 |
| JP | 2011-165558 A | 8/2011 |
| WO | 2011000776 A1 | 1/2011 |

* cited by examiner

VEHICLE CHARGING PORT LOCKING DEVICE

CROSS-REFERENCE TO RELATED APPLICATIONS

This application is a U.S. National stage application of International Application No. PCT/JP2012/073795, filed Sep. 18, 2012, which claims priority to Japanese Patent Application No. 2011-224014 filed in Japan on Oct. 11, 2011.

BACKGROUND

1. Field of the Invention

The present invention relates to a charging port locking device for charging a battery installed in a vehicle.

2. Background Information

Japanese Laid-Open Patent Application Publication No. H09-161884 discloses a technology related to charging port locking devices. The abovementioned publication discloses a charging connector for connecting a charging port of an electric vehicle and a charging station constituting a power supply device, allowing the charging port and the charging connector to be connected in order to perform charging.

SUMMARY

There may be occasions in which it takes a comparatively long time to charge a vehicle provided with a comparatively high-capacity battery, such as an electric vehicle, at a charging station. On such occasions, there is a risk of the connection between the charging port and the charging connector being broken due to causes other than deliberate action on the part of the driver, with the result that charging is not performed, leading to a situation in which charging is not completed even when the driver returns after a predetermined charging time has elapsed.

The present invention was contrived in view of the problems described above, it being an object thereof to provide a charging port locking device capable of avoiding inadvertent connection breaks between a charging port and a charging connector.

In order to achieve the object described above, the charging port locking device according to the present invention is provided with a locking mechanism that enters a locked state or an unlocked state through the rotation of a restraining member in a charging port to which power is supplied from an external power source through a charging connector via user operation, the restraining member being screwed in place to a rotating actuator of the locking mechanism, and the screw being provided within a hood of the vehicle.

Because it is possible to avoid the charging connector being inadvertently released during charging, it is possible to prevent situations in which charging is not complete even when the driver returns after a charging time has elapsed. Moreover, even if the rotating actuator fails, rendering the connection completely unreleasable, the connection can be released by rotating the screw in a release direction of the restraining member. In addition, because individuals not capable of accessing the vehicle interior cannot operate the connector, the inadvertent release of the charging connector can be avoided.

BRIEF DESCRIPTION OF THE DRAWINGS

Referring now to the attached drawings which form a part of this original disclosure.

DETAILED DESCRIPTION OF THE EMBODIMENTS

Selected embodiments will now be explained with reference to the drawings.

First Embodiment

Figure 1:
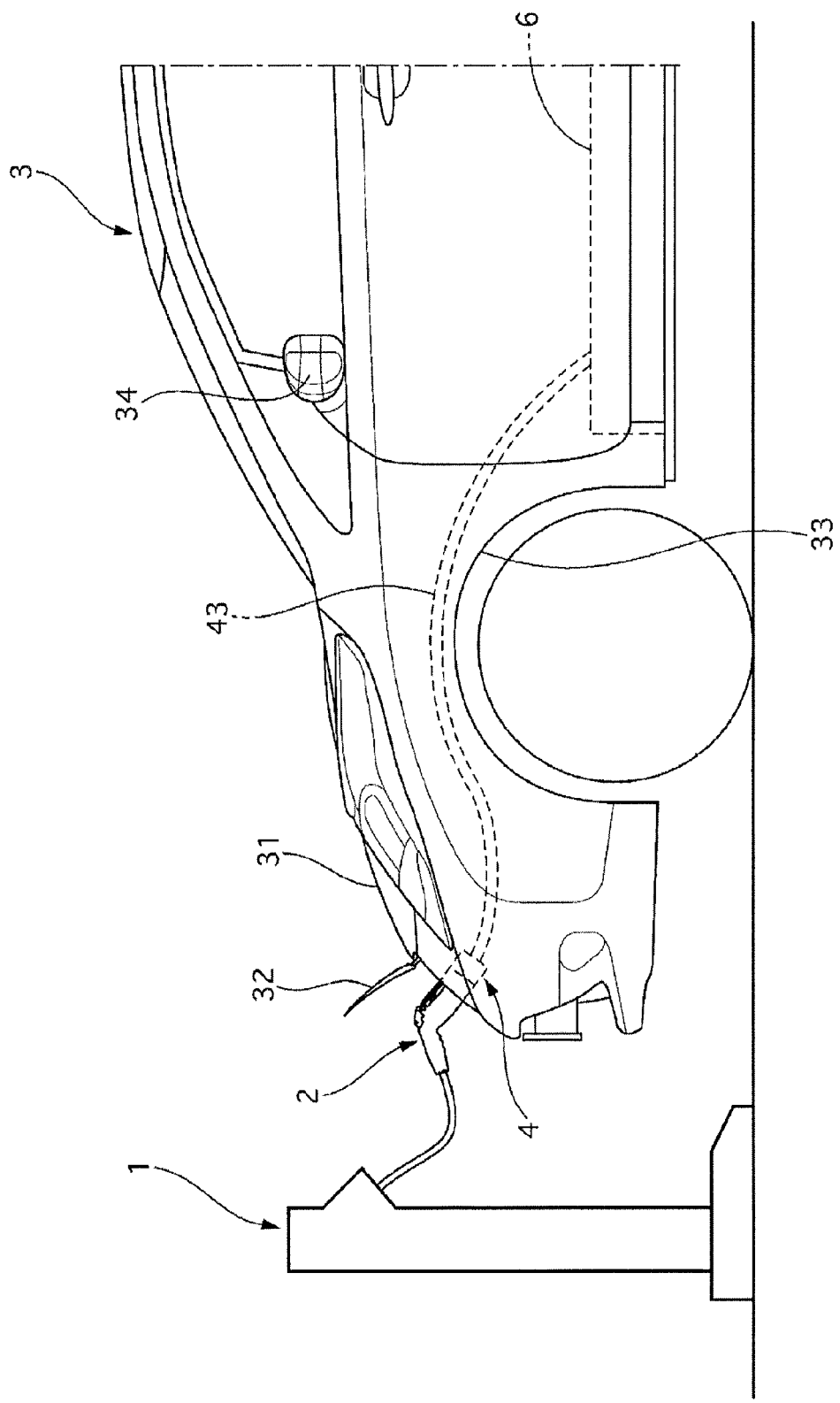
FIG. 1 is a schematic view of a vehicle provided with a charging port locking device according to a first embodiment being charged.

FIG. 1 is a schematic view of a vehicle provided with a charging port locking device according to a first embodiment being charged. A charging port 4 electrically connected to an onboard battery 6 installed on the floor of a vehicle 3 by a cable 43 is provided at the front of a vehicle 3 to the front of a hood 31. The charging port 4 is provided at a position at roughly the same height as the upper end of a wheel well 33 and lower than a side mirror 34, and is closed by a charging lid 32 when the vehicle is not being charged. The charging station 1 is provided with a charging connector 2 for supplying power, and, when charging the vehicle, the charging lid 32 is opened and the charging connector 2 is inserted into the charging port 4, thereby charging the vehicle. The vehicle according to the first embodiment is provided with both a rapid charging port for use when connecting to a rapid charger and a normal charging port for use when charging using household power or the like. The description of the first embodiment will focus on the normal charging port. This is because charging using the rapid charging port requires a comparatively short amount of time, and rarely involves the vehicle being left charging for extended periods. It goes without saying that the rapid charging port may also provided with a locking mechanism.

Figure 2:
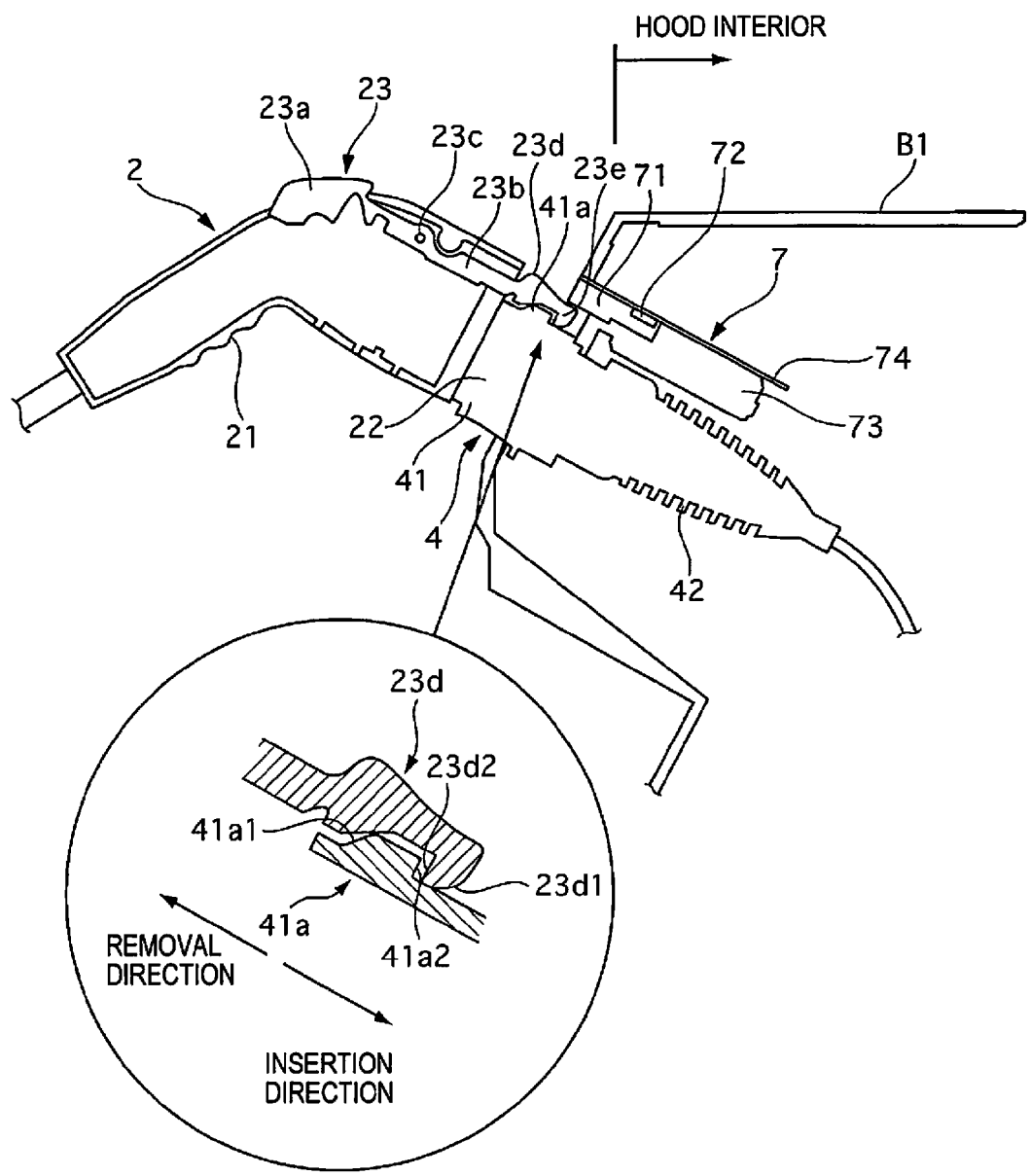
FIG. 2 is a schematic cross-sectional view of a charging connector and a charging port according to the first embodiment in a connected state.

FIG. 2 is a schematic cross-sectional view of a charging connector and a charging port according to the first embodiment in a connected state. The charging port 4 comprises an inserted member 41 that is anchored to a body piece B1 on a side of the vehicle by a bracket 74, a cable 43 connected to the inserted member 41 on the inside of the vehicle frame, and a tube 42 covering a connecting section of the cable 43. A raised part 41a (engaged part) is formed on the outer circumference of the inserted member 41, and an insertion hole into which an inserted section 22 on an inner circumference of the inserted member 41 can only be inserted at predetermined relative positions.

The charging connector 2 is a standardized type in wide general use, with a standardized shape and size, and is connected by a user to the charging port 4 of the vehicle. The charging connector 2 comprises a grip section 21 gripped by a user, the inserted section 22 inserted into the charging port 4 on the vehicle, and an engaging member 23 capable of being engaged with and disconnected from the charging port 4 by a user. When the charging connector 2 is connected to the charging port 4, the engaging member 23 engages with the raised part 41a provided on the charging port 4, thereby restricting the movement in the direction in which the charging connector 2 is removed from the charging port 4.

The engaging member 23 rotates about a support point 23c anchored to a case member of the charging connector 2. The engaging member 23 is biased by an elastic member not shown in the drawing so that a release button 23a is positioned above as seen in FIG. 2 (i.e., so that a hook part 23d is positioned below in FIG. 2). A release button 23a that a user can press while gripping the grip section 21 is present on an end nearer the grip section 21. Meanwhile, the raised part 41a and the engaging hook part 23d are present on an end nearer the inserted section 22. The hook part 23d has a key-like hooked shape comprising a curved surface section 23d1 comprising a smooth curved surface having an end part that is smooth with respect to the insertion direction and a stepped section 23d2 that is sharp with respect to the removal direction. Meanwhile, a sloped surface 41a1 is formed on an end of the raised part 41a facing the outside of the vehicle frame, and an engaging surface 41a2 that is roughly perpendicular to the removal direction is formed on an end facing the inside of the vehicle frame, forming an anisotropic raised shape.

When the charging connector 2 is inserted into the charging port 4, the curved surface section 23d1 on the end part of the hook part 23d passes over the sloped surface of the raised part 41a without there being a particular need to operate the release button 23a. Subsequently, when the stepped section 23d2 passes the engaging surface 41a2, the hook part 23d is pushed downward by an elastic member not shown in the drawings, and the hook part 23d and the raised part 41a engage. The charging connector 2 may also be inserted while the release button 23a is pressed. The engagement of the stepped section 23d2 and the engaging surface 41a2 thus restricts movement in the removal direction even if a user pulls the charging connector 2 in the removal direction without operating the release button 23a. To release this engagement, the release button 23a is pressed to rotate the engaging member 23 around the support point 23c, and the hook part 23d is moved above the engaging surface 41a2 to release engagement.

Figure 3:
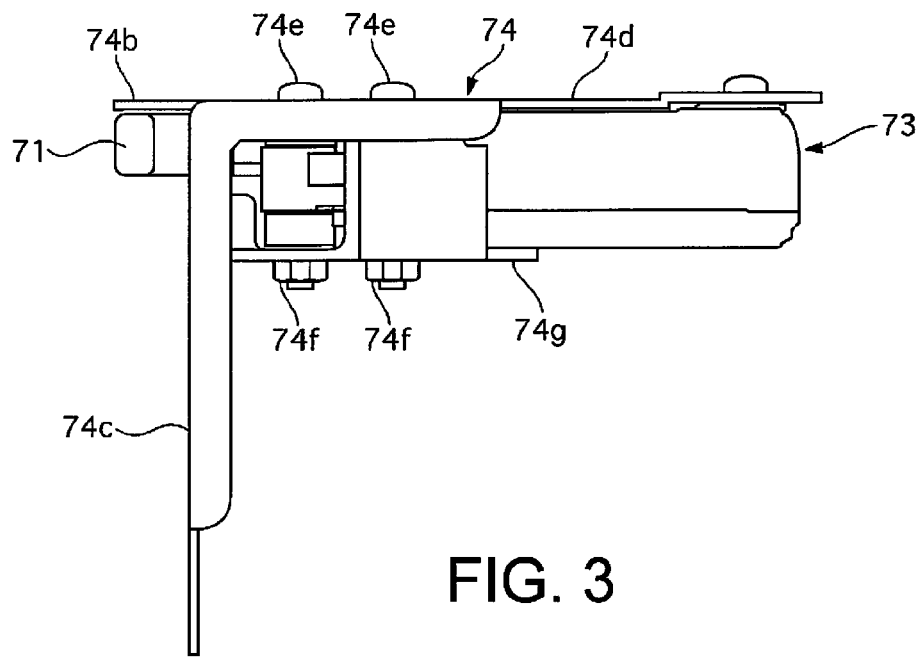
FIG. 3 is a side view showing the configuration of a locking mechanism according to the first embodiment.
Figure 4:
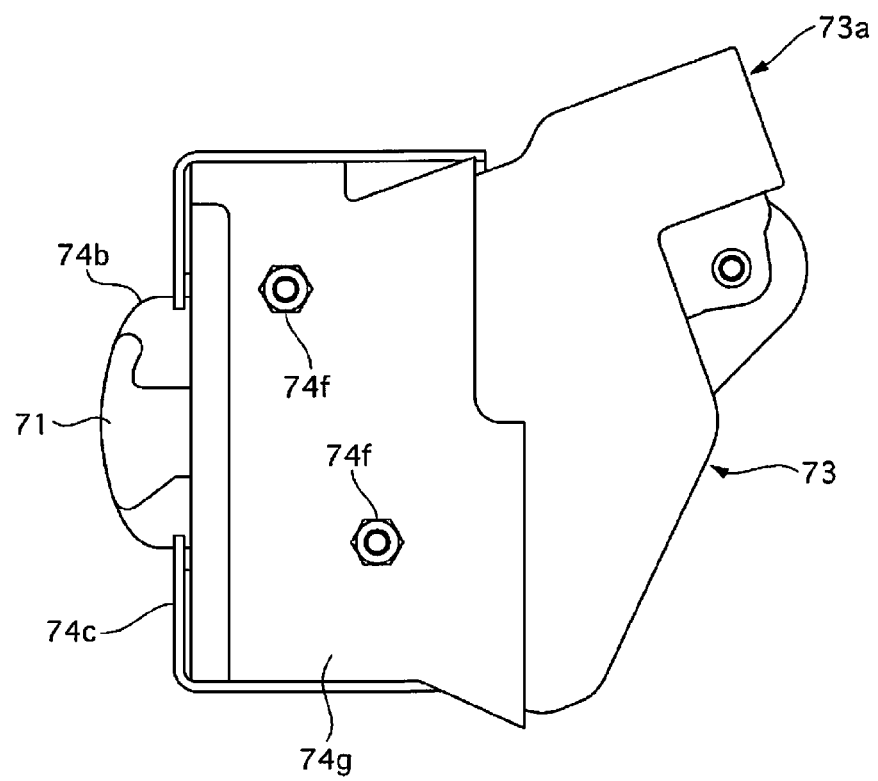
FIG. 4 is an underside view showing the configuration of a locking mechanism according to the first embodiment.

FIG. 3 is a side view showing the configuration of a locking mechanism according to the first embodiment, and FIG. 4 is an underside view of the configuration of the locking mechanism according to the first embodiment. A locking mechanism 7 restricting the rotation of the engaging member 23 is provided above the charging port 4. The locking mechanism 7 comprises a swinging arm 71 that achieves a state in which separation is restricted by the hook part 23d being positioned in a direction moving away from the raised part 41a and a state in which separation is not restricted by the former not being positioned in said direction, a lock actuator 73 that actuates the swinging arm 71, and a bracket 74 for anchoring and supporting the lock actuator 73 and the inserted member 41 of the charging port 4.

As shown in the side view in FIG. 3 and the underside view in FIG. 4, the bracket 74 comprises an upper surface section 74d to which the lock actuator 73 is anchored and supported by a bolt 74e, a support extension 74b extending from the upper surface section 74d so as to cover the range of motion of the swinging arm 71, a side surface section 74c that is bent roughly perpendicularly with respect to the upper surface section 74d and to which the inserted member 41 and the like are attached by a bolt, and a cover member 74g that is attached to a side facing the upper surface section 74d with the lock actuator 73 being sandwiched therebetween. The upper surface section 74d, the lock actuator 73, and the cover member 74g are assembled into a whole using a plurality of bolts 74e and nuts 74f. A failure forced operation opening 74a is formed in the upper surface section 74d (see FIGS. 2 and 7) allowing an anchoring screw 72 (to be described hereafter) to be operated; a user can open the hood and rotate the screw using a screwdriver or the like. The reasons for this will be described later.

Figure 5:
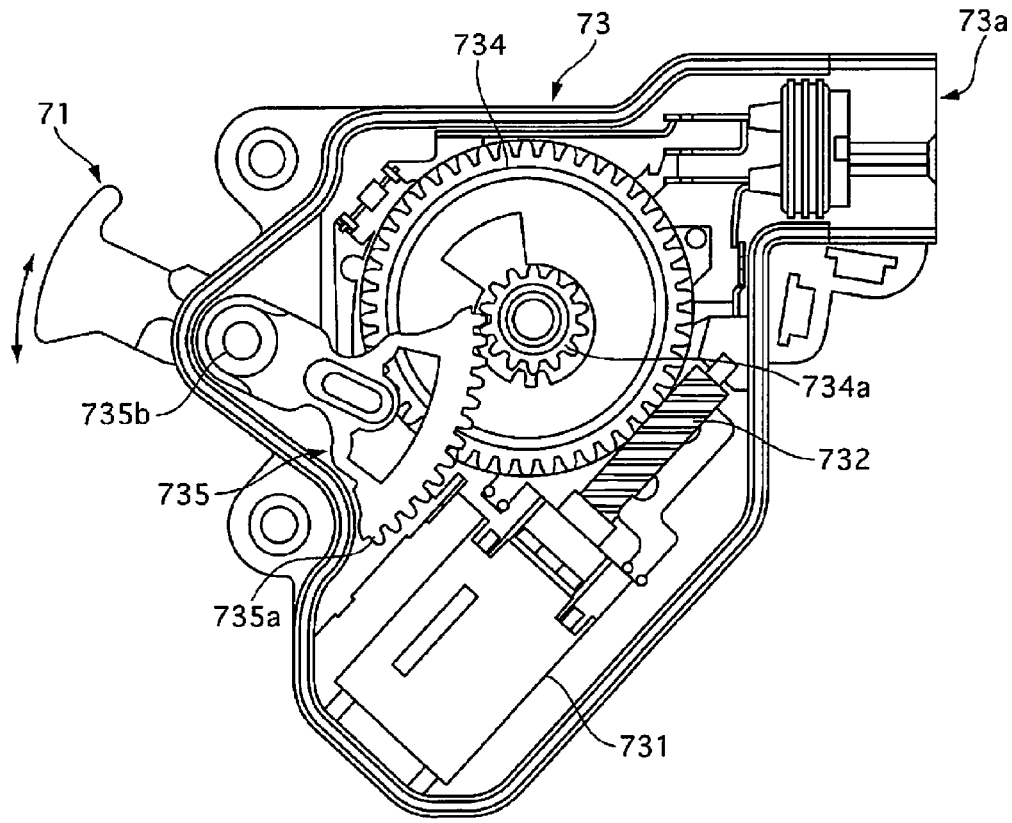
FIG. 5 is an internal structure illustration showing the mechanical configuration of the locking mechanism according to the first embodiment.

FIG. 5 is an internal structure illustration showing the mechanical configuration of the locking mechanism according to the first embodiment. The lock actuator 73 comprises a connector section 73a for connecting an external power source and a controller, a motor 731 that rotationally drives according to a command signal, a worm 732 that rotates integrally with a rotor of the motor 731, a worm wheel 734 that meshes with the worm 732 and rotates, a drive gear 734a that has a smaller diameter than and the same rotary shaft as the worm wheel 734 and rotates integrally with the worm wheel 734, and a driven member 735 that meshes with the drive gear 734a and has a toothed surface on its outer circumference. The driven member 735 comprises a meshing section 735a that is formed roughly in a fan shape and has a toothed surface on its outer circumference, and a rotary shaft section 735b assembled so as to be integral with the swinging arm 71. The swinging arm 71 is a member that moves using the rotary shaft section 735b as an axis of rotation; in other words, its axis of rotation is different from the plugging/unplugging direction of the charging connector 2 and different from the direction of the axis of rotation of the engaging member 23. In the locking mechanism according to the first embodiment, the swinging arm 71 only needs to move within a predetermined angular range; thus, using a driven member 735 having a partially toothed surface ensures torque even if the motor 731 is small. The lock actuator 73 is also of a type that is generally used in vehicle automatic door locking mechanisms; these can be repurposed without modification in order to decrease manufacturing costs.

Figure 6:
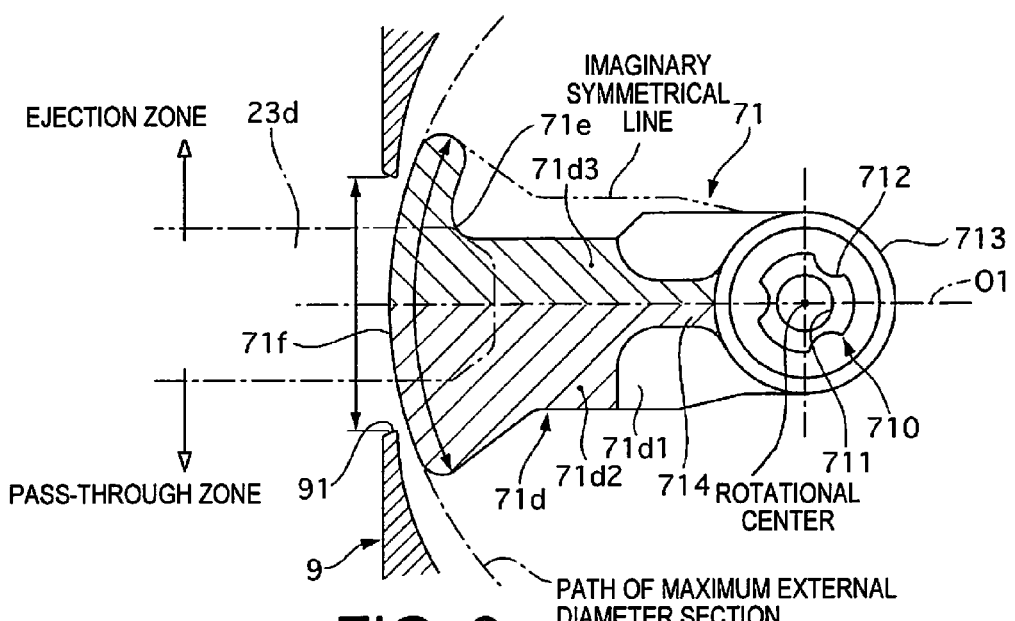
FIG. 6 is an underside view showing the configuration of a swinging arm of the locking mechanism according to the first embodiment.

FIG. 6 is an underside view showing the configuration of a swinging arm of the locking mechanism according to the first embodiment. The swinging arm 71 comprises an attachment section 710 that attaches to the rotary shaft section 735b of the lock actuator 73 so as not to rotate relatively, and a cylindrical wall 713 that covers the outer circumference of the attachment section 710. Concave parts 712 are formed at three locations on the circumference of the attachment section 710, and relative movement in a rotational direction is restricted by raised parts formed on the rotary shaft section 735b fitting into the concave parts 712. A through-hole 711 is formed in the center of the attachment section 710, and the anchoring screw 72 passes therethrough for integrally anchoring the swinging arm 71 and the rotary shaft section 735b. Because the through-hole 711 allows the upper part of the swinging arm 71 and the side nearer the lock actuator 73 to communicate, if the movement of the swinging arm 71 is impeded due to freezing or the like and hot water is poured on to remedy the freezing, the hole also functions as a flow path through which the hot water can flow, allowing the freezing to be remedied more rapidly. The anchoring screw 72 is screwed in place by a female screw part provided on the side facing the rotary shaft section 735b, causing the rotary shaft section 735b and the swinging arm 71 to move integrally.

The direction in which the anchoring screw 72 is tightened is the same direction in which the swinging arm 71 rotates to release the lock. This is to allow the anchoring screw 72 to be tightened to rotate the swinging arm 71 in the release direction even if the lock actuator 73 fails and lock release is completely impossible.

Figure 7:
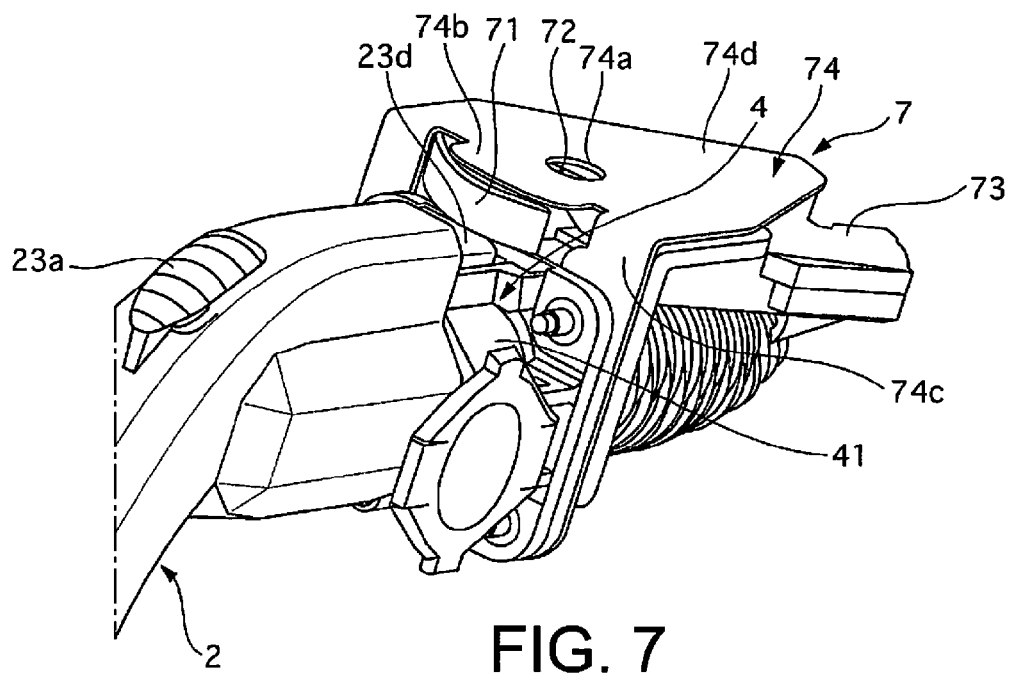
FIG. 7 is a schematic perspective view of the charging connector and the charging port according to the first embodiment in a connected state.

FIG. 7 is a schematic perspective view of the charging connector and the charging port according to the first embodiment in a connected state. Referring specifically to FIGS. 7 and 2, the anchoring screw 72 is provided within the failure forced operation opening 74a so as to be exposed within the hood. Ordinarily, a hood release lever within the vehicle is operated to open the hood. The anchoring screw 72 is located in a position allowing for easy access if the release lever can be operated; in other words, in a position that cannot be accessed even if the charging lid 32 is opened. This arrangement ensures that other individuals not having access to the vehicle interior cannot operate the anchoring screw 72. The anchoring screw 72 is designed to be easily operable using a Phillips head screwdriver forming part of an onboard toolkit or the like, allowing the user to release the screw.

A plate-like arm member 71d extends from the cylindrical wall 713 to the left in FIG. 6. The end of the arm member 71d spreads outward in a fan shape, and is designed so as to overlap the hook part 23d as viewed from above (equivalent to being positioned in the retreating direction of the engaging member). A hollowed-out section 71d1 for reducing weight and a rib 714 for ensuring the necessary strength are formed on the arm member 71d.

The swinging arm 71 is molded from plastic, and, as shown in FIG. 6, has a vertically asymmetrical shape as viewed from above. In the following description, a vertically symmetrical imaginary line will be drawn with a dotted line using an axial line O1 connecting the rotational center of the swinging arm 71 (i.e., the point where the center of the swinging arm 71 with respect to the thickness direction and the axis of rotation thereof meet) and the rotational center of the engaging member 23 when in a locked state (i.e., the point where the center of the engaging member 23 with respect to the widthwise direction and the axis of rotation thereof meet) as a top-down view reference line, and the relationship of the reference line with the imaginary symmetrical line will be described. The zone above the axial line O1 is one into which the swinging arm 71 ejects when the locking mechanism transitions from a restricting state to an unrestricting state. As such, the area above the axial line O1 will be defined as the "ejection zone", and the area below the axial line O1 as the "pass-through zone".

If the swinging arm 71 is symmetrical in the ejection zone and the pass-through zone, the area to the ejection zone side of the hook part 23d is more filled in. This leads to the following problems. Specifically, the relatively low position of the charging port 4 on the vehicle means that slush or mud kicked up by another vehicle passing nearby could splatter onto the charging port 4. If charging is performed in an extremely cold environment, such splattered slush or mud could freeze, forming icicle-like obstructions hanging from the arm member 71d of the swinging arm 71. In such cases, such icicle-shaped obstructions will form more easily if the area of the arm member 71d in the ejection zone is greater, creating the risk of the swinging arm 71 and the hook part 23d catching on each other, preventing the lock from being released even if a lock release command is issued.

Thus, the arm member 71d is greatly hollowed out in the area from the imaginary symmetrical line to around the hook part 23d. In other words, an area 71d3 of the arm member 71d present in the ejection zone (i.e., taking a line connecting the rotational center of the swinging arm 71 and the rotational center of the hook part 23d when positioned in the retreating direction of the hook part 23d as a reference, the area to the side in the direction of rotation into the restricting state, as seen from above) is smaller than an area 71d2 of the arm member 71d present in the pass-through zone (i.e., taking a line connecting the rotational center and the rotational center of the hook part 23d when positioned in the retreating direction of the hook part 23d as a reference, the area to the side in the direction of rotation into the non-restricting state, as seen from above). This allows the overhanging part in the ejection zone to be reduced, impeding the formation of icicle-shaped obstructions or the like, and consequentially allowing for smooth movement of the swinging arm 71 when releasing the lock. In particular, by shaving down just to the area overlapping the hook part 23d as viewed from above, it is possible to further reduce the possibility of obstructions or the like forming while reliably restricting movement in the retreating direction of the hook part 23d.

The maximum external diameter section 71f of the swinging arm 71 is symmetrically formed with respect to the axial line O1 as viewed from above. This is because, assuming a scenario in which sufficient rotation of the swinging arm 71 due to the operation of the lock actuator 73 is impossible due to failure or the like, ensuring the length of the maximum external diameter section 71f will make it possible to more reliably position the swinging arm 71 in the retreating direction of the hook part 23d.

Figure 8:
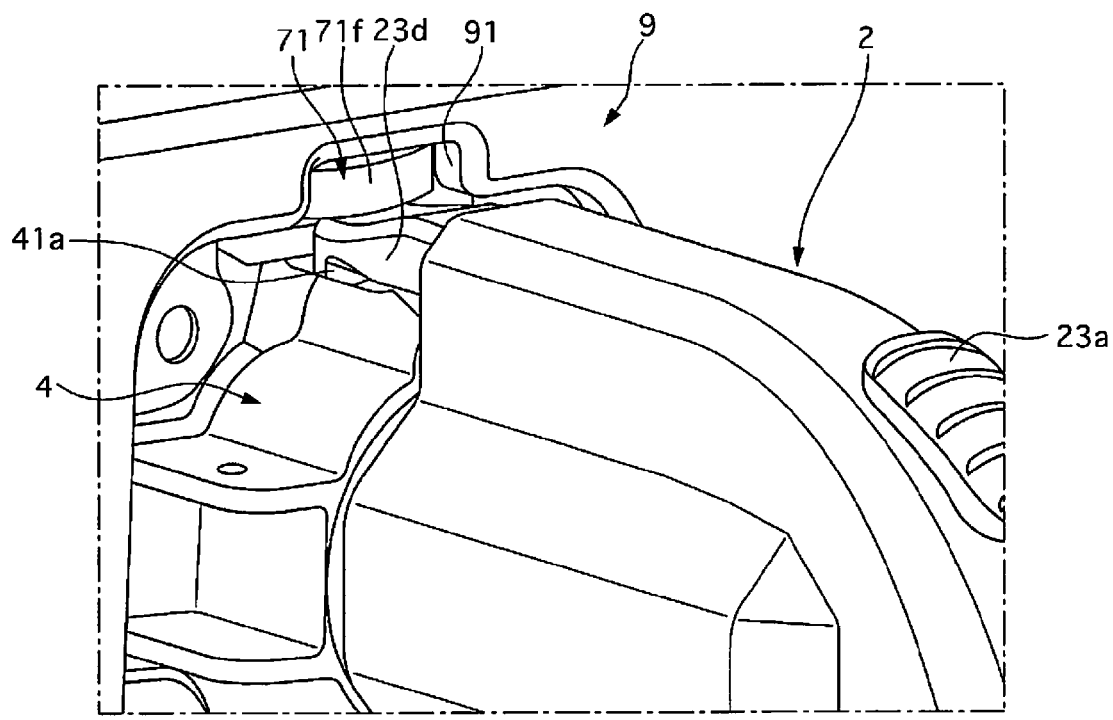
FIG. 8 is a perspective view of the charging connector and the charging port according to the first embodiment in a connected state.

FIG. 8 is a perspective view of the charging connector and the charging port according to the first embodiment in a connected state. Inserting the charging connector 2 in to the charging port 4 and operating the locking mechanism 7 to position the swinging arm 71 in the retreating direction of the hook part 23d prevents movement of the hook part 23d in the retreating direction even if the release button 23a is pressed. This makes it impossible to release the engagement of the raised part 41a and the hook part 23d, preventing the removal of the charging connector 2. A cover member 9 for protecting against the intrusion of foreign matter into the locking mechanism 7 and the like at this time is provided on the charging port 4 of the vehicle. The cover member 9 covers the side of the locking mechanism 7 facing the plugging/unplugging direction of the charging connector 2, and comprises an opening 91 allowing for the insertion of the hook part 23d and partially exposing the swinging arm 71.

Let us assume that a user has inserted the charging connector 2 into the charging port 4, operated the locking mechanism 7, and left the area, thereby starting charging. At this time, the maximum external diameter section 71f of the swinging arm 71 is exposed, as shown in FIG. 8. If there were a large gap between the cover member 9 and the maximum external diameter section 71f, a finger or the like could be inserted into the gap to forcibly pry the swinging arm 71 open. Thus, the gap between the swinging arm 71 and the cover member 9 is narrowed to the extent that the two do not touch.

When in a state in which removal of the charging connector 2 is restricted by the locking mechanism 7, the entirety of the opening 91 is closed off by the maximum external diameter section 71f of the swinging arm 71. In other words, the rotational direction length of the maximum external diameter section 71f is greater than the width of the opening 91 (in the rotational direction). This is to eliminate the possibility of a finger or the like being inserted into a gap between an end of the opening 91 and an end of the swinging arm 71 to forcibly pry open the swinging arm 71.

Returning to FIG. 6, the relationship between the cover member 9 and the swinging arm 71 will be described in detail. As shown in FIG. 6, the clearance between the inner circumferential surface of the cover member 9 and the path of the maximum external diameter section 71f when the swinging arm 71 rotates is set so as to progressively increase as the distance from the opening 91 increases. If the charging connector 2 is connected to the charging port 4 when there is foreign matter (such as gum, mud, dust, etc.) adhering to the hook part 23d, the rotation of the swinging arm 71 will wipe ("sweep") off the foreign matter when it moves. If the clearance between the inner circumferential surface and the path of the maximum external diameter section 71f were set so as to progressively decrease, there would be a risk of the wiped-off foreign matter being wedged into the clearance, leading to high resistance and inhibiting the movement of the swinging arm 71. Thus, the clearance between the inner circumferential surface of the cover member 9 and the path of the maximum external diameter section 71f is set so as to progressively increase as the distance from the opening 91 increases, allowing the wiped-off foreign matter to drop off and avoiding clogs.

Figure 9:
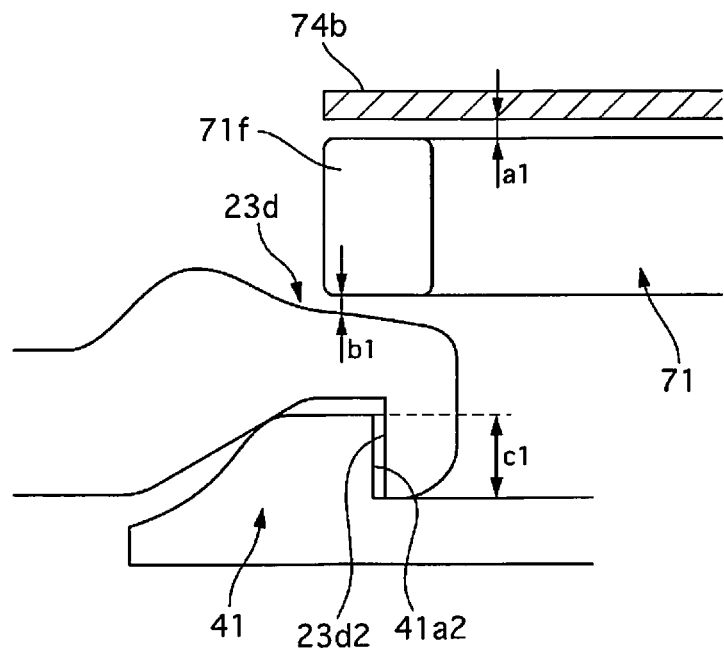
FIG. 9 is a schematic cross-sectional view of the relative positions of an engaging member and the swinging arm according to the first embodiment.

FIG. 9 is a schematic cross-sectional view of the relative positions of an engaging member and the swinging arm according to the first embodiment. There is a predetermined gap a1 between the upper surface of the swinging arm 71 and the support extension 74b, and a predetermined gap b1 is present between the underside of the swinging arm 71 and the hook part 23d. As a result, there is no contact between the support extension 74b and the hook part 23d when the swinging arm 71 rotates, allowing the swinging arm 71 to move smoothly. Taking c1 as the height of the zone in which the stepped section 23d2 and the engaging surface 41a2 overlap as viewed from the plugging/unplugging direction of the charging connector 2, the relationship c1>(a1+b1) obtains. Thus, even if the hook part 23d is forcibly lifted and the gaps a1, b1 are eliminated, as shown in FIG. 10, the engagement of the stepped section 23d2 and the engaging surface 41a2 is maintained.

Figure 10:
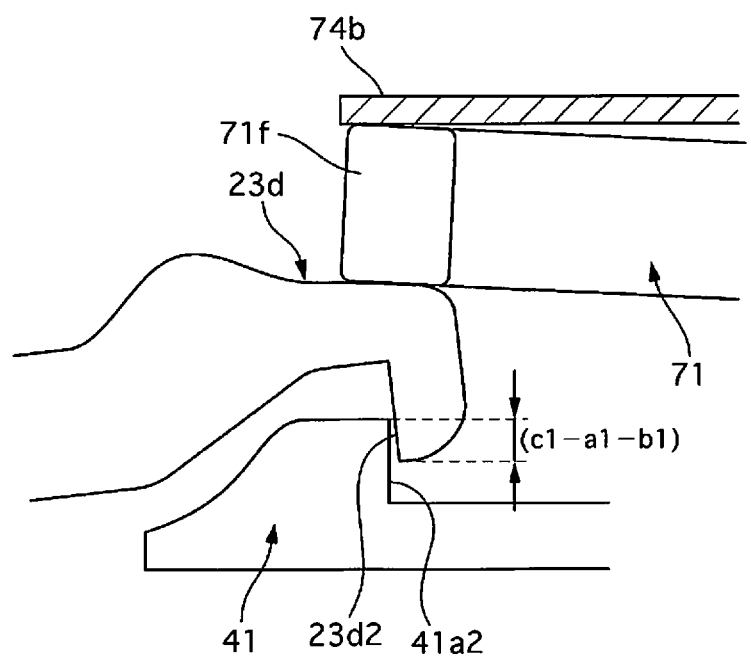
FIG. 10 is a schematic cross-sectional view of the relative positions of the engaging member and the swinging arm according to the first embodiment when the engaging member is forcibly moved in a retreating direction.

FIG. 10 is a schematic cross-sectional view of the relative positions of the engaging member and the swinging arm according to the first embodiment when the engaging member 23 is forcibly moved in a retreating direction. If the release button 23a were to be pressed with the locking mechanism 7 in operation and movement in the retreating direction being restricted, the upper surface of the hook part 23d would contact the underside of the swinging arm 71, lifting up the swinging arm 71. Because the swinging arm 71 is made of plastic, the rotary shaft section 735b of the lock actuator 73 is also not especially strong, meaning that the swinging arm 71 is easily pushed upwards via deformation or skewing of the axis of rotation. However, the provision of the support extension 74b means that further deformation is prevented via contact with the support extension 74b. Moreover, because force is only applied in the thickness direction of the swinging arm 71, sufficient strength against compressive forces can be ensured even if the plastic swinging arm 71 is made of plastic. That is, the axis of rotation of the swinging arm 71 is different from the plugging/unplugging direction of the charging connector 2 and different from the direction of the axis of rotation of the engaging member 23. Stated in still different terms, the direction of the axis of rotation of the swinging arm 71 and the direction of the axis of rotation of the engaging member 23 are not parallel, and the interposition of the swinging arm 71 in the retreating direction of the hook part 23d has a restricting effect; in addition, a support extension 74b is provided. Thus, even if excessive force is applied by the hook part 23d, the force does not act in the rotational direction of the swinging arm 71, allowing a sufficient restricting state to be maintained without the need for the swinging arm 71 to be rigid with respect to the rotational direction or for the structure near the axis of rotation to be reinforced.

As described above, the following effects can be attained by the first embodiment. (1) The charging port 4 is provided that comprises the raised part 41a (engaged part) for engaging with the hook part 23d (engaging part) of the charging connector 2 via an operation performed by a user such that power is supplied from an external power source when in an engaged state, and the locking mechanism 7 that, when the hook part 23d and the raised part 41a are in an engaged state, achieves a locked state in which release of the engaged state is restricted by the movement of the swinging arm 71 (restraining member) in a locking direction, thereby preventing release of the hook part 23d, and achieves an unlocked state in which release is permitted by the movement of the swinging arm 71 in an unlocking direction opposite the locking direction, the swinging arm 71 being anchored to the lock actuator 73 (rotating actuator) of the locking mechanism 7 by the anchoring screw 72 (screw), and the anchoring screw 72 being exposed within the hood of the vehicle.

This allows inadvertent release of the charging connector 2 during charging to be avoided. In addition, the provision of the locking mechanism 7 on the vehicle allows for use with existing charging stations. In addition, even if the lock actuator 73 fails and lock release is completely impossible, the anchoring screw 72 can be rotated in the release direction of the swinging arm 71 to release the lock. In addition, because individuals not capable of accessing the vehicle interior cannot operate the connector, the inadvertent release of the charging connector 2 can be avoided.

(2) The rotational direction in which the swinging arm 71 rotates from the locked state to the unlocked state is identical to the direction in which the anchoring screw 72 is tightened. Thus, to forcibly release the lock due to failure or the like, the lock can be released by tightening the anchoring screw 72. In other words, the risk of the anchoring screw 72 coming loose and being incapable of rotating any further that would be present if the screw were rotated in a direction opposite the tightening direction can be avoided.

(3) The swinging arm 71 has the through-hole 711 that extends in the direction of the lock actuator 73. Thus, in cases in which the movement of the swinging arm 71 is impeded due to freezing or the like and hot water is poured on to remedy the freezing, the through-hole 711 functions as a flow path through which the hot water can flow, allowing the freezing to be remedied more rapidly.

Second Embodiment

Figure 11:
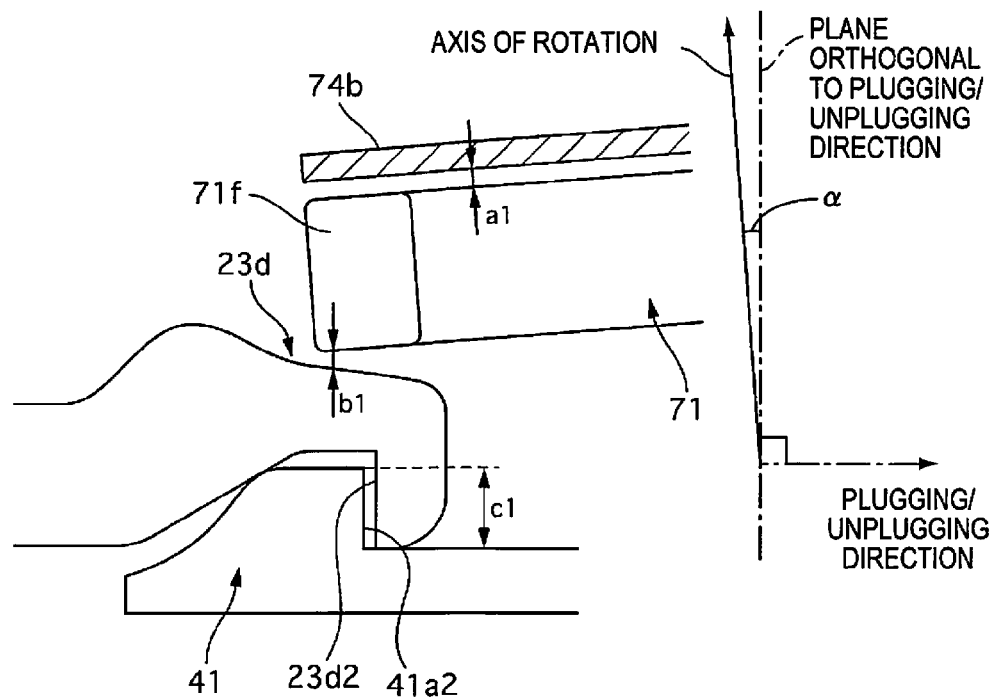
FIG. 11 is a schematic cross-sectional view of the relative positions of an engaging member and a swinging arm according to a second embodiment.

Next, a second embodiment will be described. The basic configuration of this embodiment is identical to that of the first embodiment; thus, only the points of difference will be described. FIG. 11 is a schematic cross-sectional view of the relative positions of an engaging member and a swinging arm according to the second embodiment. Whereas the axis of rotation of the swinging arm 71 was set on a plane orthogonal to the plugging/unplugging direction of the engaging member 23 in the engaging member 23 in the first embodiment, it is set on a plane that intersects the plugging/unplugging direction, i.e., at a predetermined angle α with respect to the orthogonal direction, in the second embodiment. The predetermined angle α is in a direction inclining towards the hook part 23d. Accordingly, even if the hook part 23d is forced up, the force is borne by the shaft section in the axis of rotation of the swinging arm 71, allowing for more stable restriction. The second embodiment is an example in which a support extension 74b is formed, but there is no particular need for a support extension 74b as long as strength is ensured.

Third Embodiment

Figure 12:
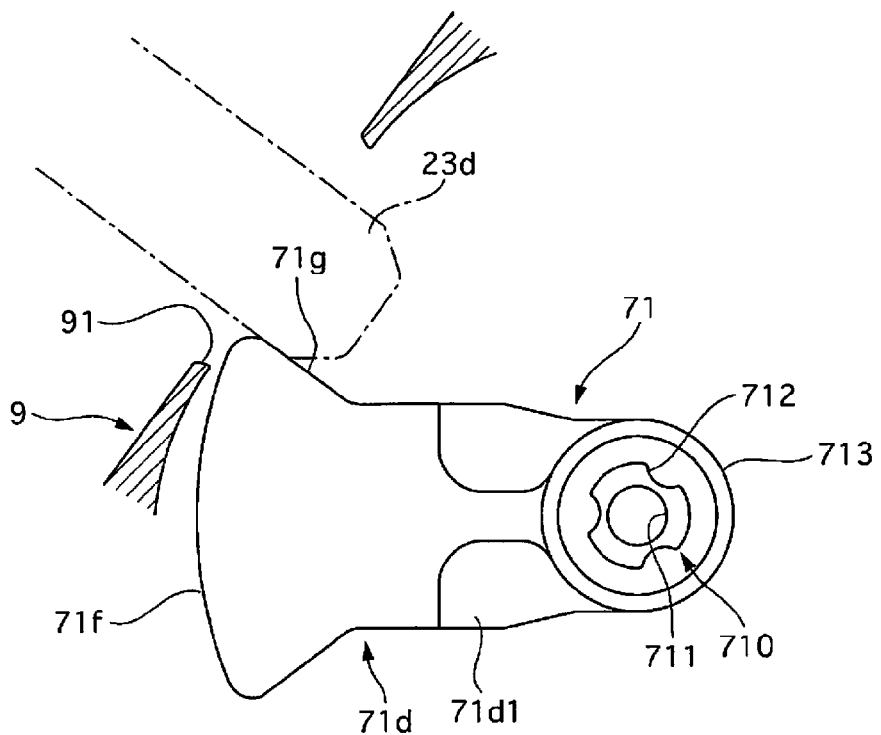
FIG. 12 is an underside view showing the configuration of a swinging arm of a locking mechanism according to a third embodiment.

Next, a third embodiment will be described. The basic configuration of this embodiment is identical to that of the first embodiment; thus, only the points of difference will be described. FIG. 12 is an underside view showing the configuration of a swinging arm of a locking mechanism according to the third embodiment. The third embodiment differs from the first in that, whereas the first embodiment has a shape that is asymmetrical with respect to the axial line O1, the shape is symmetrical in the third embodiment. The shape is also formed so as to possess and angle such that the shapes of the top-view side end section of the hook part 23d and a top-view side end section 71g of the swinging arm 71 match when transitioning to a restricting state via the rotation of the swinging arm 71. This allows a state in which the swinging arm 71 and the hook part 23d have a large overlapping area as seen from above to be rapidly attained when transitioning to a restricting state. This allows the restricting state to be more reliably maintained even if, for example, the lock actuator 73 or the like fails while the swinging arm 71 is moving, impeding sufficient rotation.

Fourth Embodiment

Figure 13:
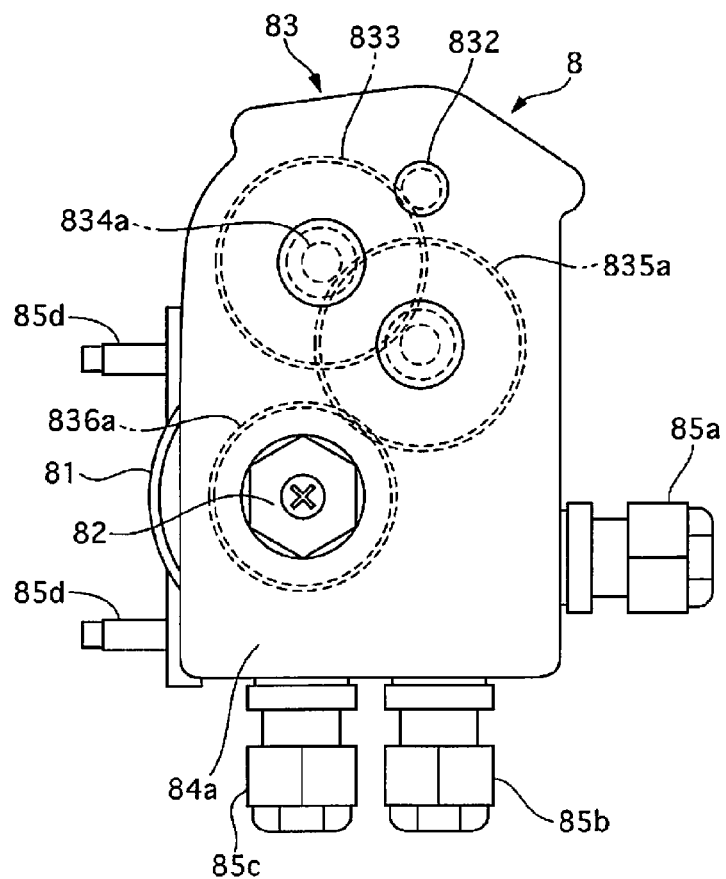
FIG. 13 is a top-down view of the configuration of a locking mechanism according to a fourth embodiment.
Figure 14:
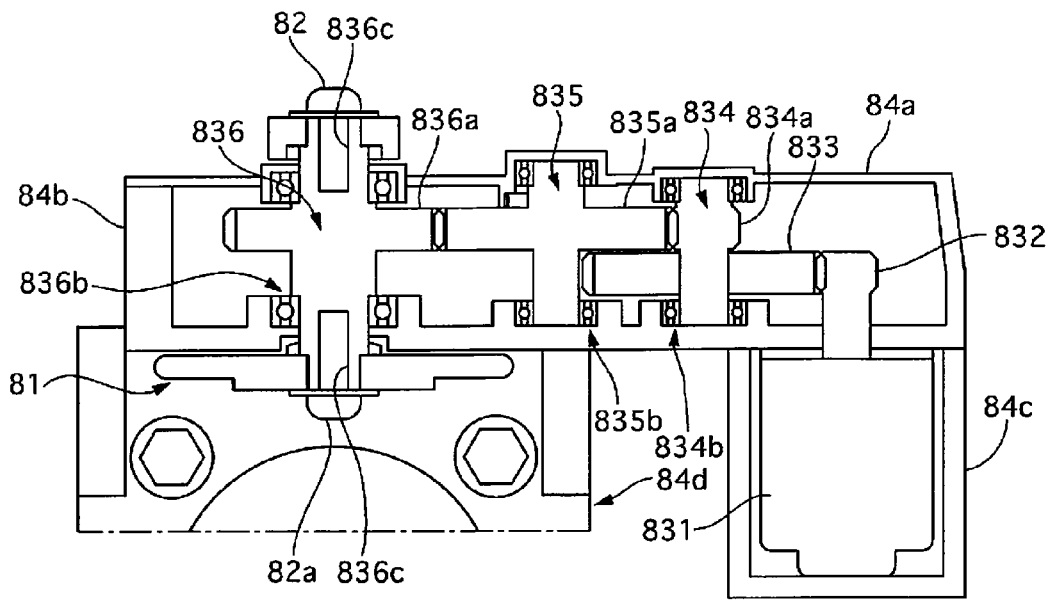
FIG. 14 is a cross-sectional view between gear shafts of the locking mechanism according to the fourth embodiment.

Next, a fourth embodiment will be described. The basic configuration of this embodiment is identical to that of the first embodiment; thus, only the points of difference will be described. FIG. 13 is a top-down view of the configuration of a locking mechanism according to the fourth embodiment, and FIG. 14 is a cross-sectional view between gear shafts of the locking mechanism according to the fourth embodiment. The fourth embodiment differs from the first in that, whereas the swinging arm 71 is rotated in the locking mechanism 7 according to the first embodiment, a rotary plate 81 is rotated in a locking mechanism 8 according to the fourth embodiment. The locking mechanism 8 comprises a lock actuator 83, and is constituted by a plurality of gear groups housed within a housing 84 of the housing 84 and a rotary plate 81. The housing 84 comprises a lower housing section 84b having an open upper surface, an upper housing section 84a covering the upper surface of the lower housing section 84b, a bracket section 84d, formed beneath the rotary plate 81, to which the charging port 4 and the like are attached, and a motor housing section 84c for housing a motor 831. The bracket section 84d is provided with an anchoring and supporting support member 85d on a side facing the vehicle frame, and harness ports 85a, 85b, 85c allowing for connection between a harness and the motor 831 and a sensor or the like not shown in the drawings.

A pinion 832 connected to the motor 831 constantly meshes with a first gear 833 that integrally rotates with a first rotary shaft 834. A first rotary shaft gear 834a is formed on the outer circumference of the first rotary shaft 834, and constantly meshes with a second gear 835a that rotates integrally with a second rotary shaft 835. The second gear 835a constantly meshes with a third gear 836a that rotates integrally with a third rotary shaft 836. The first rotary shaft 834, the second rotary shaft 835, and the third rotary shaft 836 are rotatably borne with respect to the upper housing section 84a and the lower housing section 84b by bearings 834b, 835b, 836b. This ensures sufficient strength against forces in directions causing the shafts to tilt. When a drive command is outputted to the motor 831, rotational driving force is transmitted from the first rotary shaft 834 to the second rotary shaft 835, and thence to the third rotary shaft 836, thereby rotating the rotary plate 81.

Screw holes 836c are formed in the centers of both ends of the third rotary shaft 836, with an emergency screw 82 being attached on the side nearer the upper housing section 84a, and the rotary plate 81 being screwed in place on the side nearer the lower housing section 84b by a screw 82a. The emergency screw 82 can be turned by a Phillips head screwdriver, and a hexagonal bolt section formed on the outer circumference thereof can be turned using a wrench.

The direction in which the emergency screw 82 is tightened is the same direction in which the rotary plate 81 rotates to release the lock. This is to allow the emergency screw 82 to be tightened to rotate the rotary plate 81 in the release direction even if the lock actuator 83 fails and lock release is completely impossible. The emergency screw 82 is provided so as to be exposed within the hood. Ordinarily, a hood release lever within the vehicle is operated to open the hood. The emergency screw 82 is located in a position allowing for easy access if the release lever can be operated; in other words, in a position that cannot be accessed even if the charging lid 32 is opened. This arrangement ensures that other individuals not having access to the vehicle interior cannot operate the emergency screw 82. The emergency screw 82 is designed to be easily operable using a Phillips head screwdriver forming part of an onboard toolkit or the like, allowing the user to release the screw.

Figure 15:
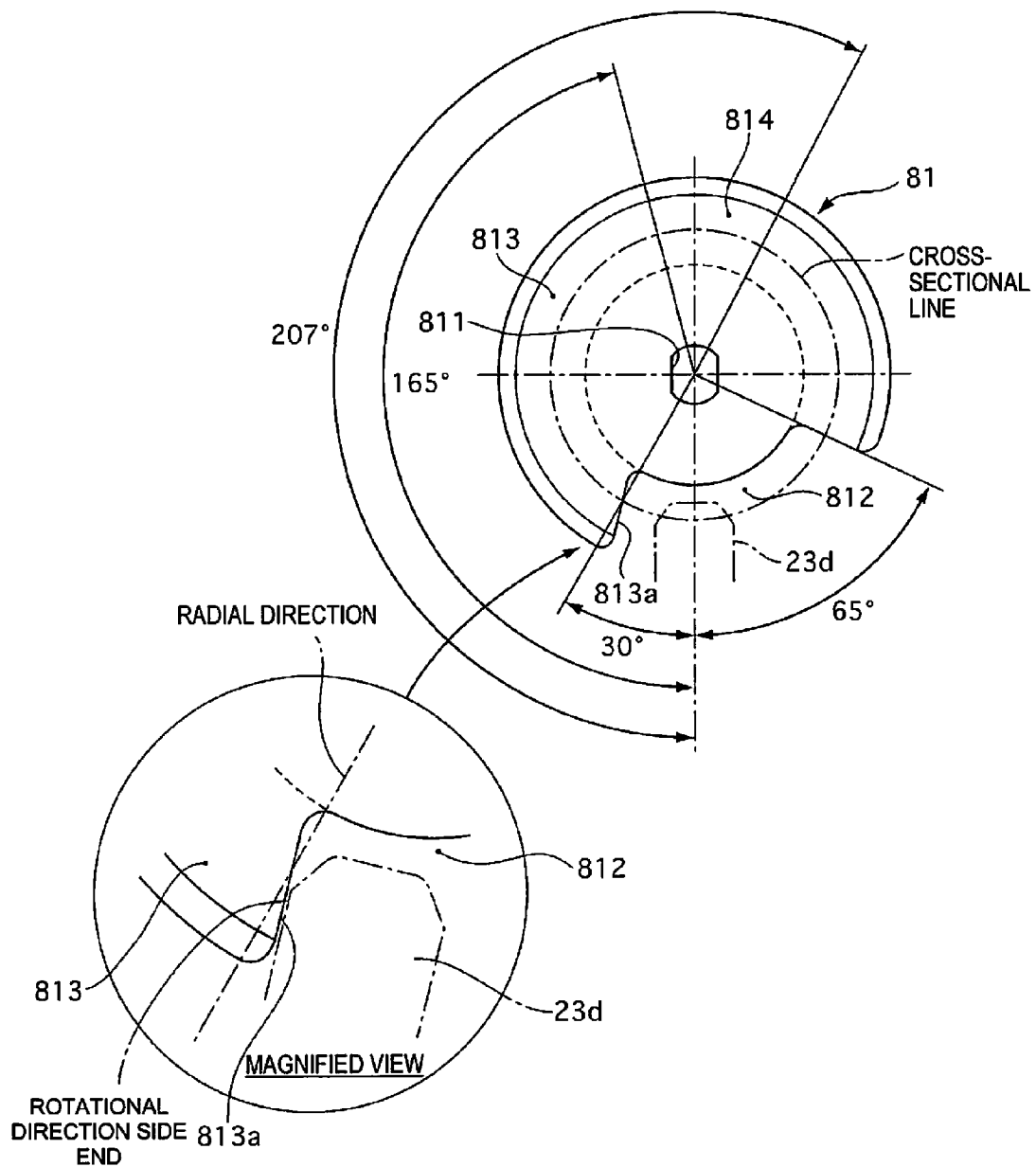
FIG. 15 is a top-down view of the configuration of a rotary plate according to the fourth embodiment.

FIG. 15 is a top-down view of the configuration of a rotary plate according to the fourth embodiment. The rotary plate 81 is a roughly disc-shaped member in the center of which is formed a two-surface-width through-hole 811 through which the third rotary shaft 836 passes, and comprises a partially cut-out section 812 along its circumference and a non-cut-out plate section 813. The relative positions of the hook part 23d and the rotary plate 81 shown in FIG. 15 are the relative positions when the charging connector 2 is inserted into the charging port 4 with the locking mechanism 8 in an unrestricting state. In the following description of the respective relative positions, the central position of the hook part 23d will be considered 0°, and the clockwise will be considered the positive direction.

The cut-out section 812 is formed in a range from −65° to +30°, i.e., a 95° range. Because the distal end of the hook part 23d occupies, at most, roughly 40° of the circumferential direction, the size of the cut-out section 812 can be considered two or more times greater than the rotational direction length of the hook part 23d. This allows a released state to be maintained when a release command is outputted to the lock actuator 83, even if the return position is overshot due to failure or the like.

The reasons for the circumferential direction length of the cut-out section 812 being sufficiently longer than the circumferential direction length of the hook part 23d are as follows. If foreign matter or the like adheres to the cut-out section 812, the cut-out section 812 may be clogged with the foreign matter if the foreign matter is sticky. In such circumstances, if the cut-out section 812 has a short circumferential direction length, the foreign matter will adhere more strongly across the two ends of the cut-out section 812. By contrast, increasing the circumferential direction length of the cut-out section 812 avoids situations in which foreign matter adheres across the two ends of the cut-out section 812; additionally, even if foreign matter adheres to only one end, the other end is open, making it easier for the foreign matter to drop off and allowing foreign matter to be removed, as appropriate.

The plate section 813 is formed in a range from +30° to +295°, i.e., a 265° range. The radial direction end of the plate section 813 has a smooth end shape along its entire circumference. A cut-out section end 813a constituting a circumferential direction starting end of the plate section 813 as well as a circumferential direction end of the cut-out section 812 is formed at an angle with respect to the radial direction. As shown in the partial magnified view in FIG. 15, the cut-out section end 813a is inclined so as to reduce the area of the cut-out section 812—more specifically, so that the end is roughly parallel with the rotational direction side end of the hook part 23d when the rotary plate 81 rotates and begins to position itself toward the retreating direction of the hook part 23d. This allows a large range of overlap with the hook part 23d as viewed from above to be obtained more quickly, rapidly achieving a reliably locked state.

Figure 16:
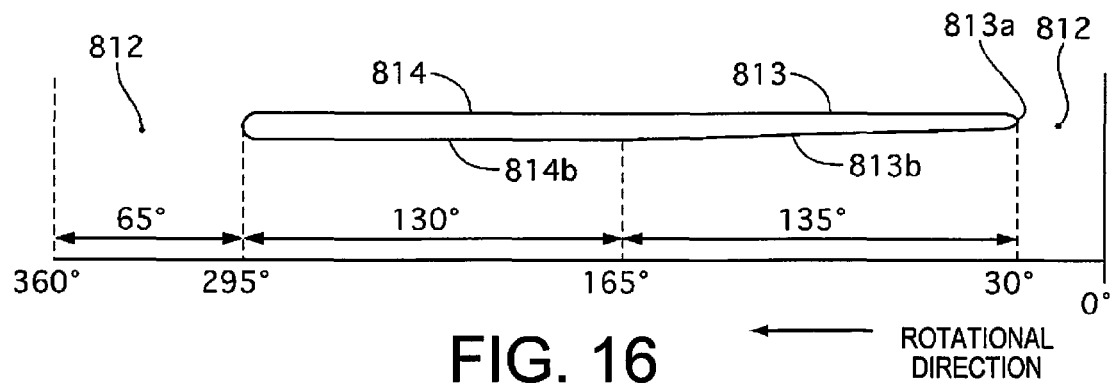
FIG. 16 is a cross-sectional view of a linearly extended cross-section along a cross-section line drawn in a circumferential direction of the rotary plate of FIG. 15.

FIG. 16 is a cross-sectional view of a linearly extended cross-section along a cross-section line drawn in a circumferential direction of the rotary plate of FIG. 15. As shown in this cross-sectional view, a tapered surface approaching the hook part 23d towards the rotational direction is formed on a first rotary plate surface 813b shown in a range from 30° to 165°. This introduces a variation in the thickness of the hook part 23d, allowing the rotary plate 81 to be interposed in the retreating direction of the hook part 23d even if a thickish model is used. Additionally, even if the rotary plate 81 presses into the hook part 23d, making the rotary plate 81 of plastic will reduce frictional drag and facilitate deformation, allowing this state to release relatively easily.

A second rotary plate surface 814b following the first rotary plate surface 813b is horizontally formed. If the plate surface were continuously tapered in the rotational direction, the overall thickness of the rotary plate 81 would increase, negatively affecting the ease with which the plate can be installed in a vehicle. In addition, if a failure in the motor 831 led to over-rotation, the plate would excessively press into the hook part 23d, inhibiting the release operation. Thus, a horizontal surface is formed, thereby making the plate more compact and avoiding excessive pressing in. The second rotary plate surface is formed over a 130° range, and occupies a larger area than the hook part 23d. Thus, even if the motor 831 fails and overspins, the restriction of the hook part 23d can be maintained.

Figure 17:
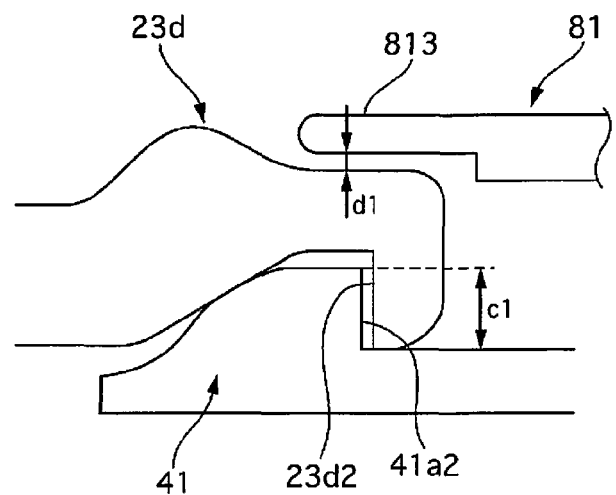
FIG. 17 is a schematic cross-sectional view of the relative positions of an engaging member and the rotary plate according to the fourth embodiment.

FIG. 17 is a schematic cross-sectional view of the relative positions of an engaging member and the rotary plate according to the fourth embodiment. A predetermined gap d1 is presented between the underside of the rotary plate 81 and the hook part 23d. Although the gap d1 will vary somewhat according to the position at which the rotary plate 81 stops rotating a value is set for a predetermined gap in the relationship with the second rotary plate surface 814b as well. As a result, there is no contact with the hook part 23d when the rotary plate 81 rotates, allowing the rotary plate 81 to move smoothly. Taking c1 as the height of the zone in which the stepped section 23d2 and the engaging surface 41a2 overlap as viewed from the plugging/unplugging d direction of the charging connector 2, the relationship c1<d1 obtains. Thus, even if the hook part 23d is forcibly lifted and the gap d1 is eliminated, the engagement of the stepped section 23d2 and the engaging surface 41a2 is maintained.

If the release button 23a were to be pressed with the locking mechanism 8 in operation and movement of the engaging member 23 in the retreating direction were restricted, the upper surface of the hook part 23d would contact the underside of the rotary plate 81, lifting up the rotary plate 81. Because the third rotary shaft 836 of the lock actuator 83 is reinforced by the bearings 836b, the hook part 23d can be pressed in. In addition, even if the rotary plate 81 deforms, the provision of the lower housing section 84b prevents further deformation by virtue of contact with the lower housing section 84b. An extending section completing covering the rotary plate 81 as seen from above may optionally be provided on the lower housing section 84b. In such cases, deformation of the rotary plate 81 can be suitably minimized even if the rotary plate 81 deforms or the third rotary shaft 836 tilts.

In such cases, because force is only applied in the thickness direction of the rotary plate 81, sufficient strength against compressive forces can be ensured even if the rotary plate 81 is made of plastic. That is, the axis of rotation of the rotary plate 81 is an axis of rotation (second axis of rotation) that is different from the plugging/unplugging direction of the charging connector 2 and different from the axis of rotation of the engaging member 23 (the first axis of rotation). Stated in still different terms, the direction of the axis of rotation of the rotary plate 81 and the direction of the axis of rotation of the engaging member 23 are not parallel, and the interposition of the rotary plate 81 in the retreating direction of the hook part 23d has a restricting effect; in addition a lower housing section 84b is provided. Thus, even if excessive force is applied by the hook part 23d, the force does not act in the rotational direction of the rotary plate 81, allowing a sufficient restricting state to be maintained without the need for the rotary plate 81 to be rigid with respect to the rotational direction or for the structure near the axis of rotation to be reinforced.

As described above, the fourth embodiment achieves the following effects.

(4) Provided are a charging port 4 that comprises a raised part 41a (engaged part) for engaging with a hook part 23d (engaging part) of a charging connector 2 via an operation performed by a user and supplies power from an external power source when in an engaged state, and a locking mechanism 8 that, when the hook part 23d and the raised part 41a are in an engaged state, achieves a locked state in which the release of the engaged state is restricted by the movement of a rotary plate 81 (restraining member) in a locking direction, thereby preventing release of the hook part 23d, and achieves an unlocked state in which release is permitted by the movement of the rotary plate 81 in an unlocking direction opposite the locking direction, an emergency screw 82 (screw) being anchored to a lock actuator 83 (rotating actuator) of the locking mechanism 8 and exposed within the hood of the vehicle. Thus, even if the lock actuator 83 fails and lock release is completely impossible, the emergency screw 82 can be rotated in the release direction of the rotary plate 81 to release the lock In addition, because individuals not capable of accessing the vehicle interior cannot operate the connector, the inadvertent release of the charging connector 2 can be avoided.

(5) The rotational direction in which the rotary plate 81 rotates from the locked state to the unlocked state is identical to the direction in which the emergency screw 82 is lightened. Thus, to forcibly releasing the lock due to failure or the like, the lock can be released by tightening the emergency screw 82. In other words, the risk of the emergency screw 82 coming loose and being incapable of rotating any further that would be present if the screw were rotated in a direction opposite the tightening direction can be avoided.

(6) The rotary plate 81 comprises a through-hole 811 that penetrates in the direction of the lock actuator 83. Thus, in cases in which the movement of the rotary plate 81 is impeded due to freezing or the like and hot water is poured on to remedy the freezing, the through-hole 811 functions as a flow path through which the hot water can flow, allowing the freezing to be remedied more rapidly.

The foregoing has been a description of various embodiments of the invention according to the present application, but other configurations are also acceptable. The first embodiment features an example in which the charging port is provided on the front of the vehicle, but the port may also be provided on the rear or side of the vehicle. In addition, while the description of the embodiments featured an electric vehicle, a plug-in hybrid vehicle is also acceptable.

The invention claimed is:

1. A vehicle charging port locking device comprising:
   a charging port having an engaged part configured to engage an engaging part of a charging connector via an operation performed by a user such that power is supplied from an external power source to the charging port when the engaging part in an engaged state with the engaged part; and
   a locking mechanism including a restraining member movably mounted with respect to the charging port between a locked state in which release of the engaging part is restricted by movement of the restraining member in a locking direction to prevent the engaging part from being released from the engaged state, and an unlocked state in which release of the engaging part is permitted by movement of the restraining member in an unlocking direction that is opposite the locking direction,
   the locking mechanism being configured to be accessibly provided beneath a hood of a vehicle, and the restraining member being capable of being moved in the unlocking direction by operation of an exposed part that is capable of being operated from beneath the hood of the vehicle.

2. The vehicle charging port locking device according to claim 1, wherein
   the exposed part is a screw that is connected to the restraining member such that rotation of the screw moves the restraining member to the unlocking direction.

3. The vehicle charging port locking device according to claim 2, wherein
   the restraining member rotates in a rotational direction from the locked state to the unlocked state that is identical to a rotational direction in which the screw is tightened.

4. The vehicle charging port locking device to claim 1, wherein
   the restraining member has a through-hole extending toward a rotating actuator of the locking mechanism, the through-hole providing a flow path through which hot water can flow to melt impediments caused by freezing.

5. The vehicle charging port locking device according to claim 2, wherein
   the restraining member has a through-hole extending toward a rotating actuator of the locking mechanism, the through-hole providing a flow path through which hot water can flow to melt impediments caused by freezing.

6. The vehicle charging port locking device according to claim 3, wherein
   the restraining member has a through-hole extending toward a rotating actuator of the locking mechanism, the through-hole providing a flow path through which hot water can flow to melt impediments caused by freezing.

7. A vehicle charging port locking device comprising:
   a charging port covered by a charging lid, the charging port having an engaged part configured to engage an engaging part of a charging connector via an operation performed by a user such that power is supplied from an external power source to the charging port when the engaging part in an engaged state with the engaged part when the charging lid is open; and
   a locking mechanism including a restraining member movably mounted with respect to the charging port between a locked state in which release of the engaging part is restricted by movement of the restraining member in a locking direction to prevent the engaging part from being released from the engaged state, and an unlocked state in which release of the engaging part is permitted by movement of the restraining member in an unlocking direction that is opposite the locking direction,
   the locking mechanism being configured to be accessibly provided beneath a hood of a vehicle, and the restraining member being capable of being moved in the unlocking direction by operation of an exposed part that is capable of being operated from beneath the hood of the vehicle.

8. The vehicle charging port locking device according to claim 7, wherein
   the exposed part is a screw that is connected to the restraining member such that rotation of the screw moves the restraining member to the unlocking direction.

9. The vehicle charging port locking device according to claim 8, wherein
   the restraining member rotates in a rotational direction from the locked state to the unlocked state that is identical to a rotational direction in which the screw is tightened.

10. The vehicle charging port locking device to claim 7, wherein
    the restraining member has a through-hole extending toward a rotating actuator of the locking mechanism, the through-hole providing a flow path through which hot water can flow to melt impediments caused by freezing.

11. The vehicle charging port locking device according to claim 8, wherein
    the restraining member has a through-hole extending toward a rotating actuator of the locking mechanism, the through-hole providing a flow path through which hot water can flow to melt impediments caused by freezing.

12. The vehicle charging port locking device according to claim 9, wherein
the restraining member has a through-hole extending toward a rotating actuator of the locking mechanism, the through-hole providing a flow path through which hot water can flow to melt impediments caused by freezing.

* * * * *